(12) United States Patent
Stamatatos et al.

(10) Patent No.: US 10,180,244 B2
(45) Date of Patent: Jan. 15, 2019

(54) ILLUMINATING SAFETY AND NOTIFICATION DEVICE

(76) Inventors: Haralambos A. Stamatatos, Burlingame, CA (US); Brian O'Boyle, Lake Oswego, OR (US)

( * ) Notice: Subject to any disclaimer, the term of this patent is extended or adjusted under 35 U.S.C. 154(b) by 662 days.

(21) Appl. No.: 13/016,624

(22) Filed: Jan. 28, 2011

(65) Prior Publication Data

US 2011/0249430 A1    Oct. 13, 2011

Related U.S. Application Data

(63) Continuation-in-part of application No. 10/423,271, filed on Apr. 25, 2003, now Pat. No. 7,878,678.
(Continued)

(51) Int. Cl.
| | |
|---|---|
| *F21V 23/04* | (2006.01) |
| *B60Q 1/26* | (2006.01) |
| *B60Q 1/52* | (2006.01) |
| *B60Q 7/00* | (2006.01) |
| *F21S 8/00* | (2006.01) |
| *F21V 21/096* | (2006.01) |
| *E01F 9/559* | (2016.01) |

(Continued)

(52) U.S. Cl.
CPC ........ *F21V 23/0435* (2013.01); *B60Q 1/2615* (2013.01); *B60Q 1/52* (2013.01); *B60Q 7/00* (2013.01); *E01F 9/559* (2016.02); *F21S 8/032* (2013.01); *F21S 8/033* (2013.01); *F21V 21/096* (2013.01); *B60Q 2900/30* (2013.01); *F21S 9/03* (2013.01); *F21V 21/0885* (2013.01); *F21V 23/0442* (2013.01); *F21W 2111/00* (2013.01); *F21W 2111/02* (2013.01); *F21W 2131/10* (2013.01); *F21Y 2115/10* (2016.08)

(58) Field of Classification Search
CPC ......... F21V 23/0435; E01F 9/559; B60Q 1/52
USPC ....... 362/238, 184, 219, 158, 176, 225, 486, 362/240, 249; 116/63 R–63 C; 340/18, 340/184, 471, 473, 907, 908, 907.1, 321, 340/472
See application file for complete search history.

(56) References Cited

U.S. PATENT DOCUMENTS

| | | |
|---|---|---|
| D244,910 S | 7/1977 | Chasen et al. |
| 5,149,190 A | 9/1992 | MacKenzie |

(Continued)

FOREIGN PATENT DOCUMENTS

JP          11048857 A   *  2/1999

*Primary Examiner* — Robert May
*Assistant Examiner* — Leah S Macchiarolo
(74) *Attorney, Agent, or Firm* — Haverstock & Owens LLP

(57) ABSTRACT

A safety device comprises a light source, a power source coupled to the light source, a controller coupled to the light source and the power source to control operation of the lighting device, and a connection port that transmits and receives power up and control signals. In some embodiments, the connection port transmits and receives a wired signal. In further embodiments, the connection port transmits and receives a wireless signal. In some embodiments, the connection port receives a signal from an external source. In some of these embodiments, the external source is a remote control. In further embodiments, the external source is a program located on a computing device. In still further embodiments, the external source is one or more additional connection port of one or more additional safety devices. In some embodiments, the signal is a signal to power the light source.

38 Claims, 15 Drawing Sheets

Related U.S. Application Data

(60) Provisional application No. 60/376,140, filed on Apr. 25, 2002.

(51) Int. Cl.

| | | |
|---|---|---|
| F21S 9/03 | (2006.01) | |
| F21V 21/088 | (2006.01) | |
| F21W 111/00 | (2006.01) | |
| F21W 111/02 | (2006.01) | |
| F21Y 115/10 | (2016.01) | |
| F21W 131/10 | (2006.01) | |

(56) References Cited

U.S. PATENT DOCUMENTS

| | | |
|---|---|---|
| 5,252,893 A | 10/1993 | Chacham et al. |
| 5,294,924 A | 3/1994 | Dydzyk |
| 5,412,381 A | 5/1995 | Dicks |
| 5,559,681 A | 9/1996 | Duarte |
| 5,561,346 A | 10/1996 | Byrne |
| 5,594,433 A | 1/1997 | Terlep |
| 5,685,631 A | 11/1997 | Dobert et al. |
| 5,785,410 A | 7/1998 | Branson, Sr. |
| 5,814,968 A | 9/1998 | Lovegreen et al. |
| 5,957,564 A | 9/1999 | Bruce et al. |
| 6,183,100 B1 | 2/2001 | Suckow et al. |
| 6,208,073 B1 | 3/2001 | Wang et al. |
| 6,211,626 B1 * | 4/2001 | Lys et al. ............ 315/291 |
| 6,341,875 B1 | 1/2002 | Chu |
| 6,486,797 B1 | 11/2002 | Laidman |
| 6,515,434 B1 | 2/2003 | Biebl |
| 6,517,214 B1 | 2/2003 | Mitchell, Jr. et al. |
| 6,549,121 B2 | 4/2003 | Povey et al. |
| 6,559,605 B2 | 5/2003 | Wu et al. |
| 6,641,283 B1 | 11/2003 | Bohler |
| 6,642,855 B2 * | 11/2003 | Budnovitch .......... 340/932.2 |
| 6,659,622 B2 | 12/2003 | Katogi et al. |
| 6,683,532 B2 | 1/2004 | Peet et al. |
| 6,739,735 B2 | 5/2004 | Talamo et al. |
| 6,752,515 B2 | 6/2004 | Evans et al. |
| 2005/0116667 A1 * | 6/2005 | Mueller ............ E04F 13/08 315/312 |

* cited by examiner

ILLUMINATING SAFETY AND NOTIFICATION DEVICE

RELATED APPLICATIONS

This patent application is a continuation-in-part of the U.S. patent application Ser. No. 10/423,271, filed Apr. 25, 2003, and entitled "ILLUMINATING SAFETY AND NOTIFICATION DEVICE," which claims priority under 35 U.S.C. § 119(e) of the U.S. provisional application Ser. No. 60/376,140 filed on Apr. 25, 2002 and entitled "ILLUMINATING SAFETY AND NOTIFICATION DEVICE." The U.S. patent application Ser. No. 10/423,271, filed Apr. 25, 2003, and entitled "ILLUMINATING SAFETY AND NOTIFICATION DEVICE," and the provisional application Ser. No. 60/376,140 filed on Apr. 25, 2002 and entitled "ILLUMINATING SAFETY AND NOTIFICATION DEVICE" are both hereby incorporated by reference.

FIELD OF THE INVENTION

The present invention relates to lighting devices. More particularly, the present invention relates to safety lighting devices for providing a warning or alert to persons within the vicinity of the lighting device.

BACKGROUND OF THE INVENTION

Traditionally, roadside safety flares have been used to provide a warning or alert to passing motorists of an accident or mishap. Police officers, highway patrol officers and safety officers all use roadside safety flares when they need to alert passing motorists to a potential hazard in the roadway. The presence of a flare alerts motorists to the existence of a hazard and of the need to slow down.

The conventional flare is an incendiary device which must be ignited. When the flare is ignited there is a risk of burning to the user. Also, when burning, the flare releases noxious fumes. The conventional flare is also a one-time use device with a short lifetime which must be discarded after use.

In other scenarios it is desirable to use a lighting device to illuminate a darkened area in order to aid in navigation and to indicate the presence of an individual or other object. Flashlights, strobe lights, and candles have often been used to shine light in a darkened area and to alert to the presence of an individual. However, in certain instances it is not practical to carry a portable light, such when as traversing a short space from a car to a front door, or when walking a darkened hallway in order to use the restroom or to get a drink of water. Further, a light source may not initially be needed but becomes necessary when it becomes dark. In such cases, it may be desirable to operate a light only intermittently or to control the light with an external source.

SUMMARY OF THE PRESENT INVENTION

The safety beacon of the present invention includes an arrangement of light emitting diodes (LEDs) controlled by a controller circuit and powered by a rechargeable battery source. The rechargeable battery source will recharge when coupled to any appropriate power source, including a power outlet within a vehicle and a conventional wall power outlet. Further, when coupled to such a power source, the safety beacon will draw power for operation from the power source without using the battery source. The safety beacon encases the LEDs with a base of a hard rubber casing and an outer housing forming a lens made of a high impact clear plastic. The safety beacon includes a port and connecting cable so that multiple safety beacons can be strung together. In such a configuration, the multiple safety beacons are configured to share power with all safety beacons within the chain. In some embodiments, the safety beacon includes a magnet within its base for affixing the safety beacon to metal surfaces, such as the surface of an automobile. The safety beacon also is operated either manually or by a remote control device.

In an aspect of the present invention, a portable lighting device comprises one or more light emitting diodes, a power source coupled to the light emitting diodes, a controller coupled to the light emitting diodes and to the power source to control operation of the portable lighting device and a connection port configured to couple the portable lighting device to a second portable lighting device. In some embodiments, the power source is rechargeable. The portable lighting device further comprises a power port, wherein the power source is recharged by connecting a connector cable to the power port and to a power outlet. Alternatively, the power source is a battery. In a further alternate embodiment, the power source is a solar cell. The portable lighting device further comprises a base for supporting the light emitting diodes. The portable lighting device further comprises a protective housing for protecting the light emitting diodes. The protective housing forms a lens for the light emitting diodes. The portable lighting device further comprises a wireless receiver coupled to the controller for receiving control signals from one or more of a remote control device and the second portable lighting device. Ub some embodiments, the wireless receiver receives radio frequency signals from the remote control device. The wireless receiver alternatively receives infrared signals from the remote control device. Power and control signals are shared between the portable lighting device and the second portable lighting device. The portable lighting device further comprises an attachment means for affixing the portable lighting device to a surface. In some embodiments, the attachment means is a magnet. The portable lighting device further comprises a supporting base adapter configured to couple to a safety cone and provide a support platform for supporting the portable lighting device.

In another aspect, a safety device comprises a light source, a power source coupled to the light source, a controller coupled to the light source and the power source to control operation of the lighting device, and a connection port that transmits and receives power up and control signals. In some embodiments, the connection port transmits and receives a wired signal. In further embodiments, the connection port transmits and receives a wireless signal. In some embodiments, the connection port receives a signal from an external source. In some of these embodiments, the external source is a remote control. In further embodiments, the external source is a program located on a computing device. In still further embodiments, the external source is one or more additional connection port of one or more additional safety devices. In some embodiments, the signal is a signal to power the light source. In some embodiments, the safety device further comprises an attachment mechanism for attaching the safety device to an additional object. In some embodiments, the safety device is attached to a traffic control device. In some embodiments, the connection port transmits a control signal to one or more additional safety devices. In some embodiments, the safety device further comprises a motion sensor coupled to the controller, wherein the motion sensor sends a signal to the controller and the controller operates the safety device based upon the signal from motion sensor. In some embodiments, the safety device further comprises a GPS device for determining its location and a transceiver for communicating the location of the safety device. In some of these embodiments, the GPS device is coupled to the controller, wherein the GPS device sends a signal to the controller and the controller operates the safety device based upon the signal from the GPS device. In some embodiments, the safety device further comprises a sound making device coupled to the controller, wherein the controller operates the sound making device based upon the signal from the GPS device. In some embodiments, the safety device floats when placed in water. In further embodiments, the safety device is used to mark and locate an object or event.

In a further aspect, a set of safety devices comprises a plurality of safety devices, each comprising a light source, a power source coupled to the light source, a controller coupled to the light source and the power source to control operation of the lighting device, and a connection port that transmits and receives power up and control signals in order to communicate with other safety devices in the set. In some embodiments, a connection port of a first safety device of the set of safety devices receives a signal from an external source. In some of these embodiments, the external source is a remote control. In further embodiments, the external source is a program located on a computing device. In some embodiments, the external source is one or more additional connection ports of one or more additional safety devices of the set of safety devices. In some embodiments, the connection port of the first safety device in the set of safety devices sends a signal based upon the signal from the external source to a connection port of a second safety device in the set of safety devices. In some embodiments, the signal is a signal to power the light source. In some embodiments, one or more additional safety devices of the set of safety devices further comprises a motion sensor coupled to the controller, wherein the motion sensor sends a signal to the controller and the controller operates the safety device based upon the signal from motion sensor. In further embodiments, one or more additional safety device of the set of safety devices further comprises a GPS device for determining its location and a transceiver for communicating the location of the safety device. In some embodiments, the set of safety devices is located inside one or more of a of a room and a hallway. In further embodiments, the set of safety devices is located outside. In some embodiments, set of safety devices float when placed in water. In further embodiments, the set of safety devices are used to mark and locate an object or event.

In still a further aspect, a method of providing light to an area comprises coupling a plurality of lighting devices together and sending a power up signal to a connection port of a first lighting device, wherein upon receiving the signal, the connection port of the first lighting device sends a signal to a connection port of a second lighting device to power up. In some embodiments, the signal is sent from a remote control. In further embodiments, the signal is sent from a program located on a computing device. In still further embodiments, the signal is sent from a motion sensor of the first lighting device. In some embodiments, the signal is sent from a connection port of a third lighting device. In some embodiments, the area is one or more of a of a room and a hallway. In further embodiments, the area is an outdoor area. In still further embodiments, the area is a portion of a body of water.

DETAILED DESCRIPTION

The safety beacon of the present invention is an identification light source or safety light with multiple uses. The safety beacon includes an arrangement of light emitting diodes (LEDs) controlled by a controller circuit. In some embodiments, the LEDs and the controller circuit are powered by a rechargeable battery source. The rechargeable battery source will recharge when coupled to any appropriate power source, including a power outlet within a vehicle and a conventional wall outlet. Further, when coupled to such a power source, the safety beacon will draw power for operation from the power source without using the battery source. The safety beacon encases the array of LEDs with a base of a hard rubber casing and an outer housing forming a lens and made of a high impact clear plastic. The safety beacon includes a port and connecting cable so that multiple safety beacons can be strung together. In such a configuration, the multiple safety beacons are configured to share power with all safety beacons within the chain. Also, in the multiple safety beacon configuration, the safety beacons pass control signals in order to provide sequential flashing illumination up and down the set of safety beacons, if set to that mode. In some embodiments, the safety beacon includes a magnet within its base for affixing the safety beacon to metal surfaces, including but not limited to the surface of an automobile, heavy equipment, barricades, light posts and warehouse shelving. The safety beacon also is operated either manually or by a remote control device. The safety beacon includes a wireless receiver for receiving control signals from the remote control device. In an alternate embodiment, the safety beacon includes a wireless transceiver not only for receiving control signals from the remote control device, but also for wirelessly sending and receiving control signals to and from other safety beacons. In this alternate embodiment, the safety beacons wirelessly pass control signals in order to provide sequential flashing illumination up and down the set of safety beacons, without the need for connecting cables.

Figure 1:
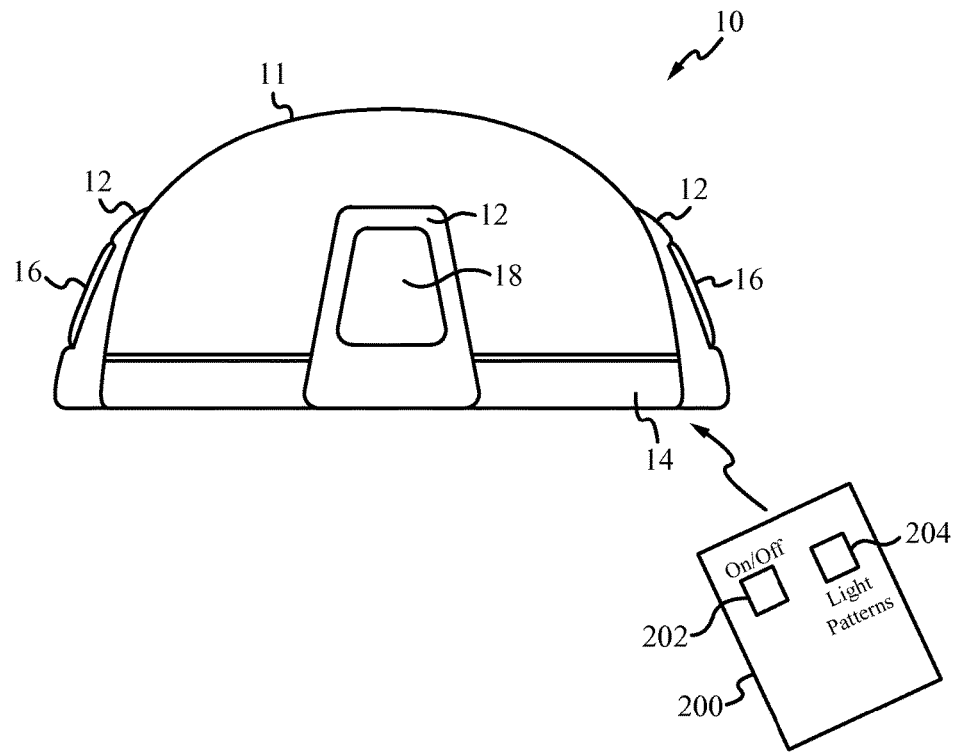
FIG. 1 illustrates a front view of the safety beacon of an embodiment of the present invention.

A front view of the safety beacon of an embodiment of the present invention is illustrated in FIG. 1. The safety beacon 10 includes a base 14, an outer housing 11 and four protective posts 12 positioned an equal distance around the outer housing 11. In the embodiment of FIG. 1, the protective posts 12 are integrally coupled to the base 14. In an alternate embodiment, the protective posts 12 are each connected to the base 14 and the outer housing 11 separately, in any appropriate manner. There is a connecting port 16 within a center cutout of two protective posts 12 disposed on opposite sides of the safety beacon 10. Alternatively, any number of connecting ports 16 can be included around the safety beacon. Each connecting port 16 includes a female adapter for receiving the end of a cable, as described in more detail below, in order to couple multiple safety beacons 10 together. In some embodiments, a power switch 18 is included within a center cutout of one of the protective posts 12 for turning the safety beacon 10 on and off. Also, in manual operation, the power switch 18 is used to toggle through the different modes of operation of the safety beacon, including OFF, STEADY and FLASHING.

In some embodiments of the present invention, the operation of the safety beacon 10 is also controlled from a remote control device 200. In some embodiments, the remote control 200 sends wireless commands to a radio frequency receiver within the safety beacon 10. Alternatively, the remote control 200 sends the wireless commands in any appropriate manner, including infrared or bluetooth. The remote control 200 includes a power button 202 for turning the safety beacon 10 on and off. The remote control 200 also includes a light pattern control button 204 for controlling the display of the light emitting diodes within the safety beacon 10. Using the light pattern control button 204, a user can toggle between light patterns of steady and blinking.

In some embodiments, the outer housing 11 is screwed into the base 14 to form an integral unit for use. Alternatively, the outer housing 11 is coupled to the base 14 in any appropriate manner including by snap fit. The outer housing 11 and the base 14 are formed of durable and sturdy materials in order to withstand longterm use in inclement weather and substantial impacts. Within some embodiments of the present invention, the base 14 and the protective posts 12 are formed of thermo plastic urethane and the outer housing 11 is formed of a tinted polycarbonate vacuum molded lens. Alternatively, the outer housing 11 is formed of any other appropriate material, including tinted acrylic. Further, the base 14 is formed of any other appropriate material.

Figure 2:
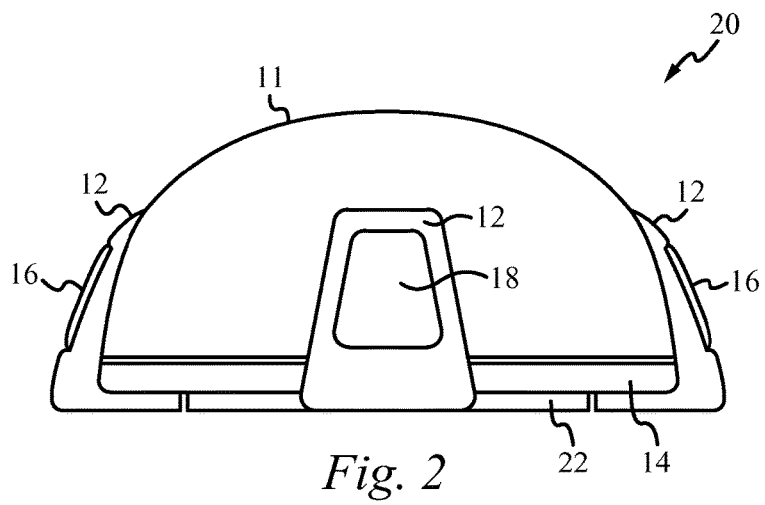
FIG. 2 illustrates a front view of the safety beacon of an alternative embodiment.

A front view of the safety beacon of an alternate embodiment of the present invention is illustrated in FIG. 2. The safety beacon 20 includes a base 14, an outer housing 11 and four protective posts 12 positioned an equal distance around the outer housing 11. In contrast to the safety beacon of FIG. 1, the protective posts 12 of the safety beacon 20 extend below the base 14. The safety beacon 20 also includes a magnet 22 underneath the center of the base 14 for affixing the safety beacon 20 to metal surfaces, such as the sides or top of a vehicle.

Figure 3:
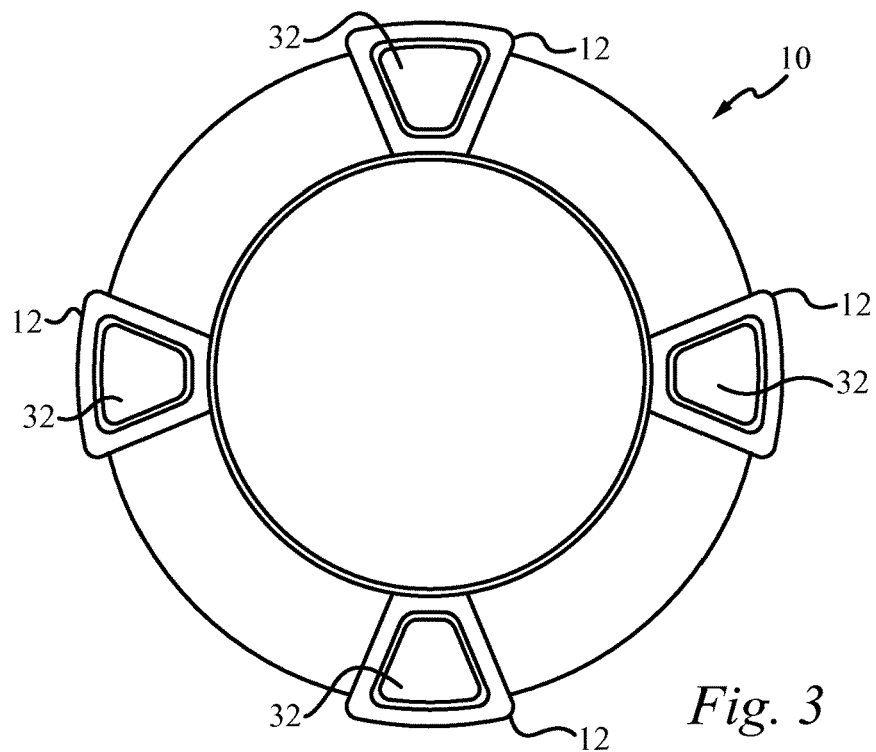
FIG. 3 illustrates a bottom view of the safety beacon of the present invention.

A bottom of the safety beacon 10 in accordance with some embodiments is illustrated in FIG. 3. The safety beacon 10 includes magnets 32 within the bottom of the protective posts 12 for affixing the safety beacon 10 to metal surfaces, such as the sides or top of a vehicle, heavy equipment, barricades, light posts and warehouse shelving.

Figure 4:
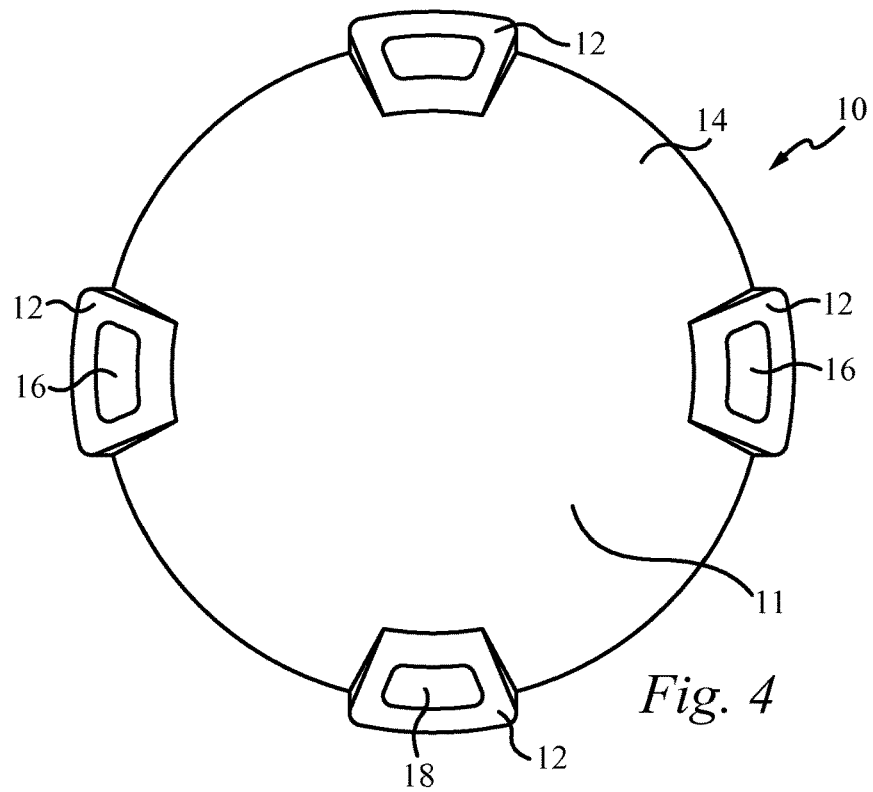
FIG. 4 illustrates a top view of the safety beacon of the present invention.

A top view of the safety beacon 10 of an embodiment of the present invention is illustrated in FIG. 4. As discussed above, the safety beacon 10 includes a base 14, an outer housing 11 and four protective posts 12 positioned an equal distance around the outer housing 11. A power switch 18 is included within a center cutout of one of the protective posts 12 for turning the safety beacon 10 on and off and toggling manually through the modes of operation. In some embodiments, there is also a connecting port 16 within a center cutout of two protective posts 12 disposed on opposite sides of the safety beacon 10.

Figure 5:
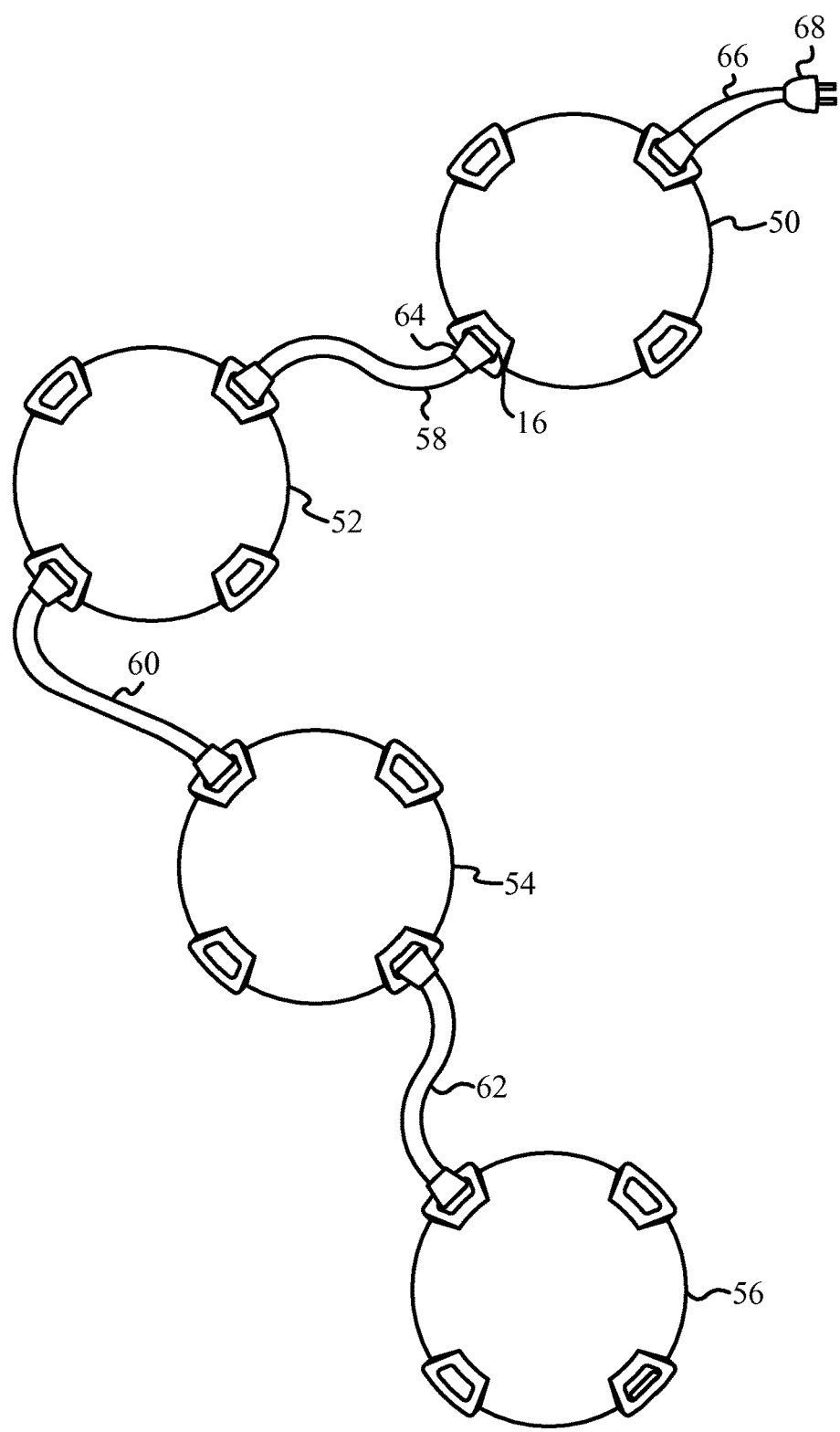
FIG. 5 illustrates a set of safety beacons coupled together by cables.

A set of safety beacons coupled together by cables is illustrated in FIG. 5. The set of safety beacons illustrated in FIG. 5 includes four safety beacons for exemplary purposes. It should be understood that any number of safety beacons can be coupled together in this manner. A first safety beacon 50 is coupled to a second safety beacon 52 by a connecting cable 58. The second safety beacon 52 is coupled to a third safety beacon 54 by a connecting cable 60. The third safety beacon 54 is coupled to a fourth safety beacon 56 by a connecting cable 62. Each of the cables 58, 60 and 62 include a plug 64 on each end which fits into a connecting port 16 on the safety beacon. A power cable 66 is also plugged into the first safety beacon 50 for providing power to the set of safety beacons. The power cable 66 includes a plug 68 configured to plug into a conventional wall power outlet. The power cable 66 can also include a plug to plug into a vehicle power adapter, such as a cigarette lighter. The power cable 66 is also used to recharge the rechargeable battery within the safety beacon, as will be discussed below.

When coupled together by a cable, the safety beacons share power and control signals. When the power cable 66 is plugged into a power source and to a safety beacon within the set, all of the safety beacons coupled together within the set draw power from the power source. When none of the safety beacons within the set are coupled to a power cable 66, the safety beacons within the set each draw power first from their own rechargeable battery and then from the rechargeable batteries of the other safety beacons within the set, until none of the rechargeable batteries have any power remaining. Using the remote control 200 (FIG. 1), the safety beacons within the set can be controlled to all have a steady light or blink. The safety beacons within the set can also be controlled to each flash sequentially up and down the set of safety beacons, by passing an alternating control signal through the cables.

In an alternate embodiment, the safety beacon includes a wireless transceiver not only for receiving control signals from the remote control device, but also for wirelessly sending and receiving control signals to and from other safety beacons. In this alternate embodiment, the safety beacons wirelessly pass control signals in order to provide sequential flashing illumination up and down the set of safety beacons, without the need for connecting cables.

Figure 6:
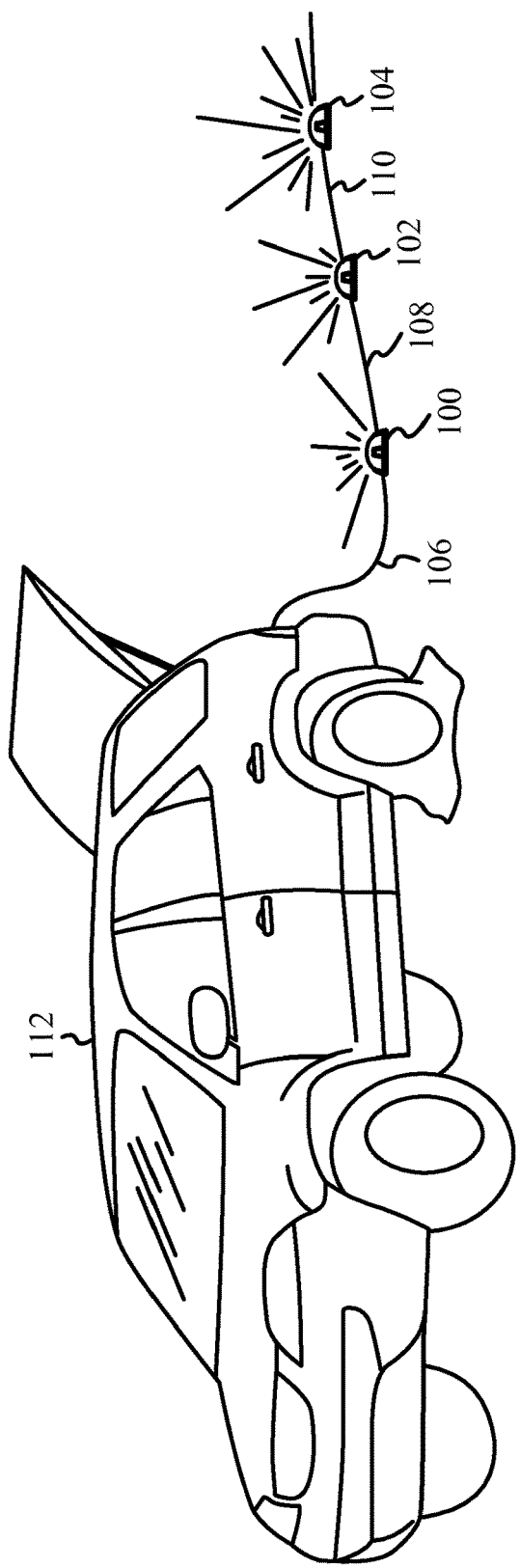
FIG. 6 illustrates a set of safety beacons coupled together by cables and coupled to a vehicle for power, protection and recharging.

A set of safety beacons coupled together by cables and coupled to a vehicle for power is illustrated in FIG. 6. In the exemplary configuration of FIG. 6, a power cable 106 is coupled between a power adapter within a vehicle 112 and a first safety beacon 100. The first safety beacon 100 is coupled to a second safety beacon 102 by a connecting cable 108. The second safety beacon 102 is coupled to a third safety beacon 104 by a connecting cable 110. The power cable 106 includes a plug on one end which fits into the first safety beacon 100 and a plug on the other end which fits into the power adapter within the vehicle 112. Each of the connecting cables 108 and 110 include a plug on each end which fits into a connecting port on the safety beacon.

In the configuration illustrated in FIG. 6, the power cable 106 provides power from the vehicle 112 to each of the safety beacons 100, 102 and 104, through the connecting cables 108 and 110. The power cable 106 is also used to recharge the rechargeable battery within the safety beacons 100, 102 and 104. In this configuration, in a unison mode, the set of connected safety beacons can be controlled to flash in unison with the vehicle's hazard lights, brake lights or turn signal.

Figure 7:
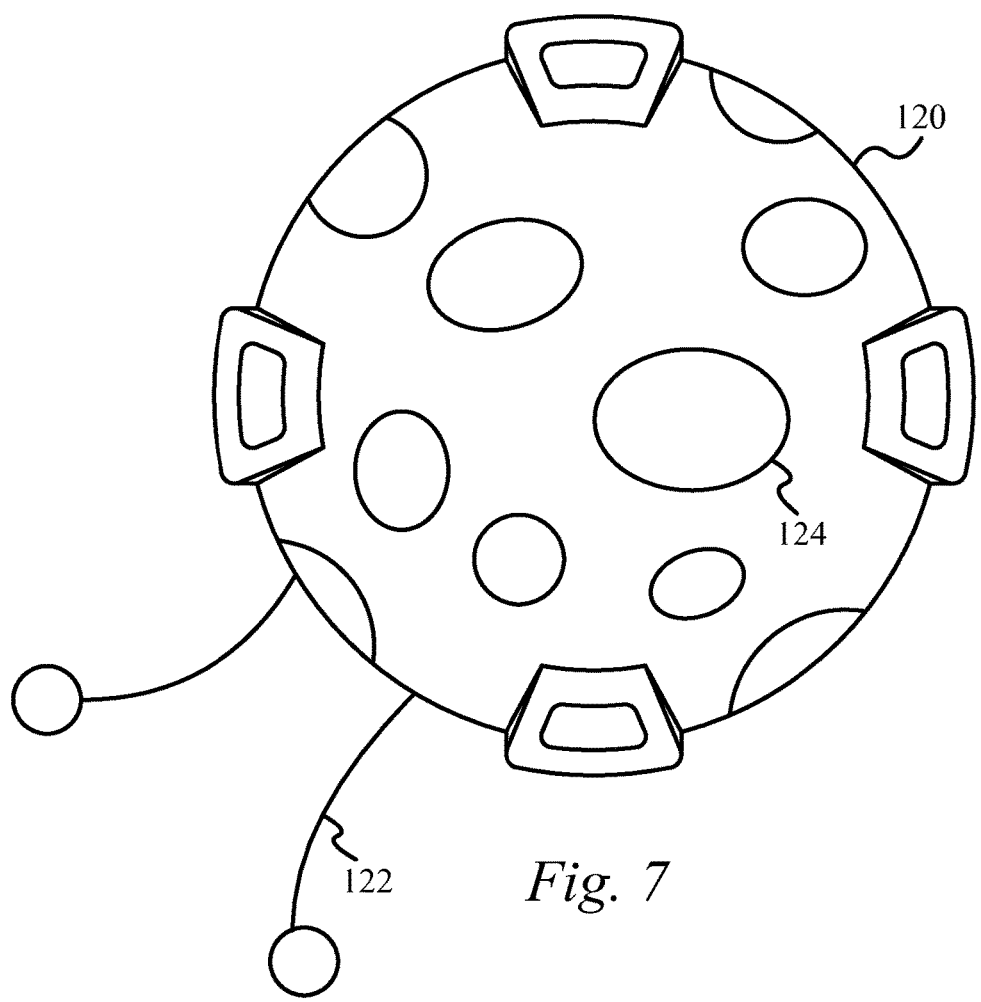
FIG. 7 illustrates a safety beacon of an alternate embodiment with a bug-like appearance.

An alternate embodiment of the safety beacon of the present invention is illustrated in FIG. 7. Within the alternate embodiment of FIG. 7, the appearance of the safety beacon 120 is altered in order to appear like a bug, with the addition of the antennae 122 and the stickers 124. The bug-like safety beacon 120 is meant to appeal to children in order to encourage children to use the safety beacon when playing in the front of their house or in other locations near busy traffic. Use of the safety beacon of the present invention in these circumstances will alert motorists of the presence of children playing and encourage them to slow down. The outer housing of the safety beacon can have different colors and interchangeable lenses in order to change the appearance of the safety beacon for different uses and conditions.

Figure 8A:
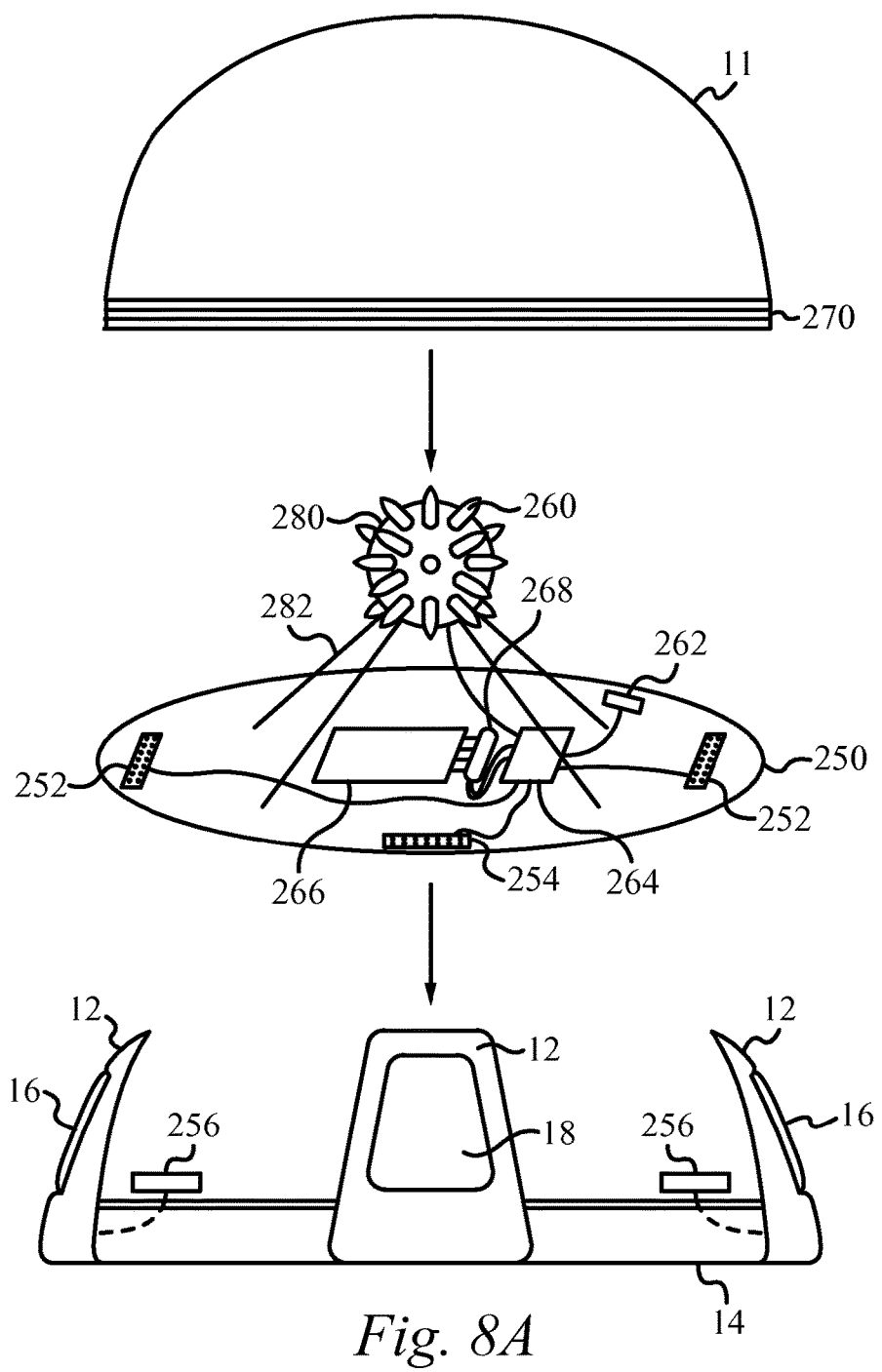
FIG. 8A illustrates components and assembly within an embodiment of the safety beacon of the present invention.

The components within an embodiment of the safety beacon of the present invention are illustrated in FIG. 8A. To assemble the safety beacon, a printed circuit board 250, supporting the LEDs 260 and including a rechargeable battery 266, a controller circuit 264, a wireless receiver 262 and connectors 252 and 254, is positioned within the base 14, the port connectors 256 are coupled to the connectors 252, a power connector (not shown) is coupled to the connector 254 and then the outer housing 11 is screwed into the base 14. The outer housing 11 includes a threaded bottom 270 which is received by the base 14 in order to securely couple the outer housing 11 to the base 14.

On the printed circuit board 250, the controller circuit 264 is coupled to the rechargeable battery 266 by the connector 268. The controller circuit 264 is also coupled to control the operation of the LEDs 260. The controller circuit 264 is also coupled to the wireless receiver 262 for receiving wireless control signals from the remote control device 200 (FIG. 1). The controller circuit 264 is coupled to the connectors 252. In some embodiments, the LEDs 260 are positioned on a support 280 supported above the printed circuit 250 by the rigid supports 282.

When the printed circuit board 250 is installed within the base 14, the connectors 252 are coupled to the port connectors 256. The port connectors 256 are coupled to the ports 16 for providing the signals from the corresponding connecting cable to the controller circuit 264. When the printed circuit board 250 is installed within the base 14, the power connector 254 is coupled to a corresponding power connector coupled to the power switch 18. Once the printed circuit board 250 is installed and connected to the appropriate ports and power switch 18, the outer housing 11 is then screwed into the base 14 to complete the assembly of the safety beacon 10. Alternatively, as discussed above, the outer housing 11 is coupled to the base 14 in any appropriate manner, in order to complete the assembly of the safety beacon 10, including by snap fit. If the battery 266 or an LED 260 needs to be replaced, the outer housing 11 can be unscrewed or unsnapped in order to allow access to the printed circuit board 250, its components and the LEDs 260.

Figure 8B:
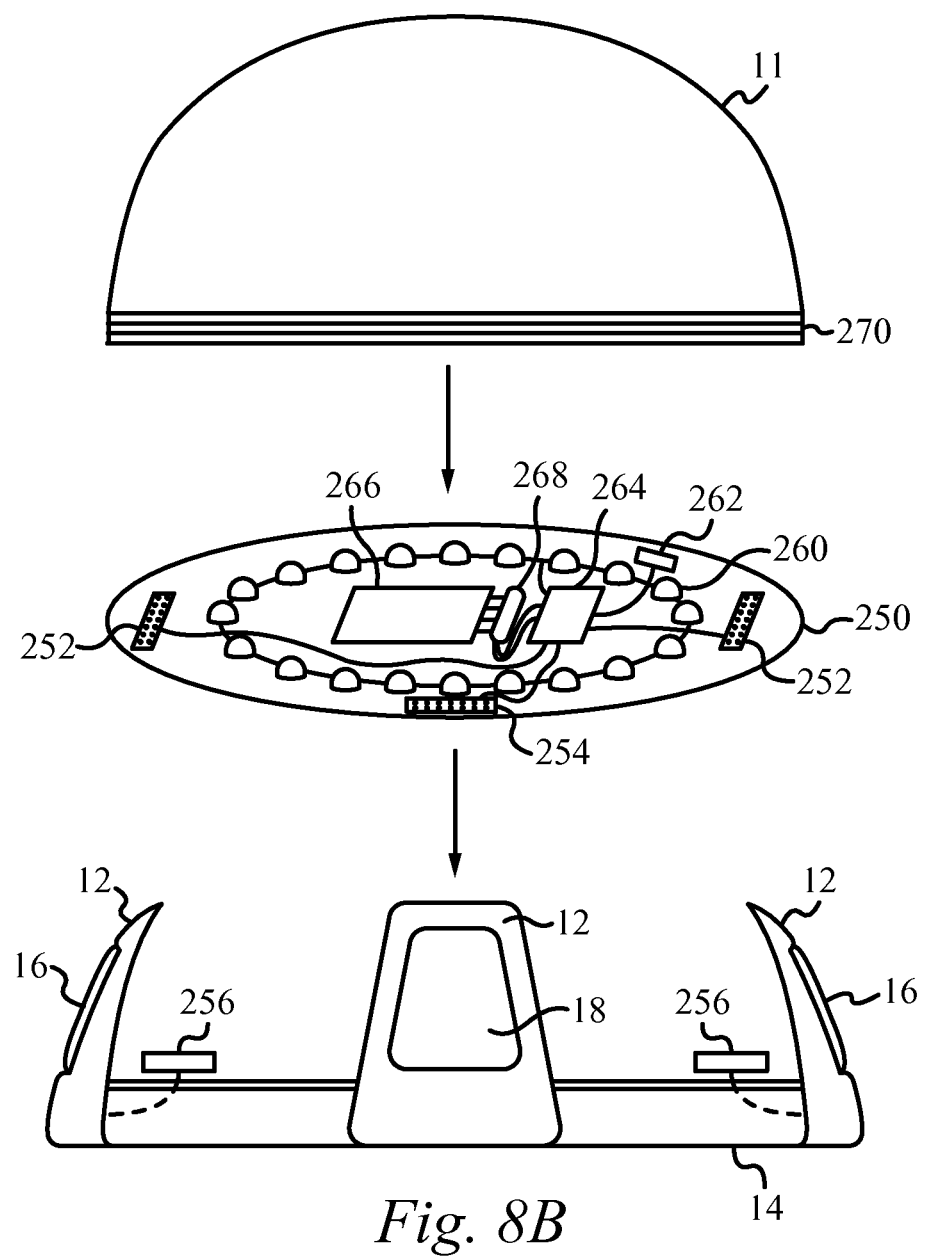
FIG. 8B illustrates components and assembly within an alternate embodiment of the safety beacon of the present invention.

The components within an alternate embodiment of the present invention are illustrated in FIG. 8B. In the embodiment illustrated in FIG. 8B, the LEDs 260 are included on the printed circuit board 250.

In operation, a single safety beacon is used by itself or multiple safety beacons are coupled together by cables in order to operate as a group. The safety beacons are turned on by using either a remote control device, as described above, or pressing the power button. In some embodiments, once turned on, the safety beacons provides steady illumination. The safety beacons can also be controlled to provide blinking illumination or if connected in a set, to provide sequentially blinking illumination up and down the connected set of safety beacons. The safety beacons are coupled to a power source, such as a vehicle power adapter or a power outlet for drawing power for operation and for drawing power to recharge the rechargeable battery within the safety beacon. Alternatively, the battery source within the safety beacon is any appropriate battery source, including but not limited to a replaceable battery and a solar battery.

If multiple safety beacons are coupled together in a set, when first powered on, all of the safety beacons will start with a steady illumination. If the user then pushes the light patterns button on the remote control or toggles the power switch to the sequentially blinking mode, the first safety beacon will blink on and the other safety beacons will be turned off. The first safety beacon will then send a control signal to the next safety beacon through the connecting cable. When the next safety beacon receives this control signal, the next safety beacon will then turn on and then send a control signal to the next safety beacon within the set. When the final safety beacon within the set receives the control signal, it will turn on and then send the control signal back to the previous safety beacon. In this manner, the safety beacons provide a continuous sequential illumination with one safety beacon flashing at a time. In the alternate embodiment described above including wireless control communications between safety beacons, the safety beacons pass the control signals necessary for sequential illumination wirelessly between the safety beacons within the set.

The safety beacon of the present invention can be used in many different circumstances and situations. One of the main uses for the safety beacon of the present invention will be in the field of automotive safety. A power cable can be plugged into a vehicle power adapter, as described above, or hardwired into the vehicle's electrical system with a power and recharging port available for connection to a safety beacon by a cable. As an automotive safety beacon, the safety beacon can be positioned on the roadway behind the automobile, as shown in FIG. 6, or attached to the automobile using the magnetic bottom. This feature is extremely beneficial on roads with no shoulder or on city streets where there may be no room for conventional flares or lights to be placed on the ground near the automobile. Using the magnetic bottom, the safety beacon can also be attached to vehicles being towed. It should be apparent to those skilled in the art that any other appropriate means for affixing the safety beacon to a surface can be used, including but not limited to screws, nails, velcro and tape. Traffic control personnel can also use safety beacons to help direct traffic and alert motorists to traffic patterns. Safety beacons can be used at major events for traffic control and illuminating pathways to be followed by automobiles or other vehicles. Safety beacons can also be used for funeral processions as a notification to other drivers as to their need to stay grouped together.

Figure 9A:
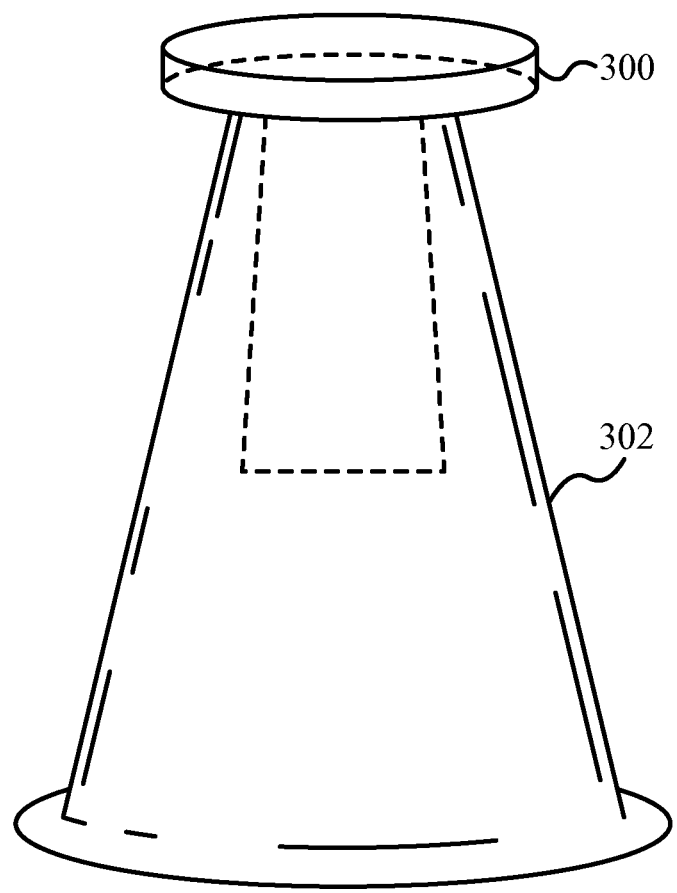
FIG. 9A illustrates a supporting base adapter which fits into a standard safety cone and supports the safety beacon of the present invention.
Figure 9B:
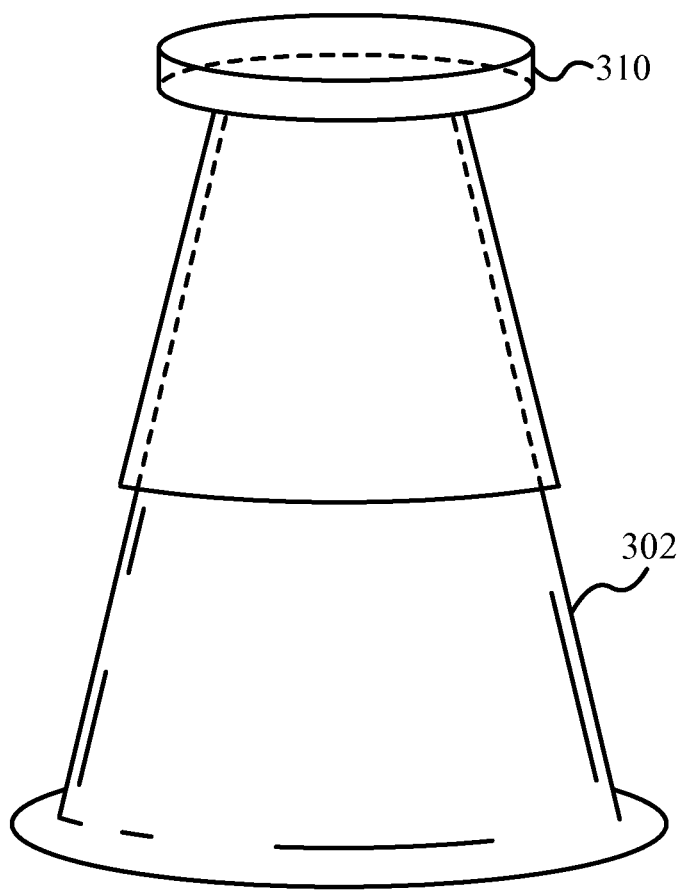
FIG. 9B illustrates a supporting base adapter which fits over a standard safety cone and supports the safety beacon of the present invention.

Roadway workers and cleanup crews can also use safety beacons for protection to notify passing traffic that they are working near or on the roadside. A supporting base adapter which fits into a standard safety cone is illustrated in FIG. 9A. The supporting base adapter 300 of FIG. 9A fits inside a safety cone 302 and provides a platform on which a safety beacon is placed. The safety beacon is then placed on the platform of the base adapter 300 and can operate on top of the safety cone 302. A supporting base adapter which fits over a standard safety cone is illustrated in FIG. 9B. The supporting base adapter 310 of FIG. 9B includes a sleeve which fits over a safety cone 302 and provides a platform on which a safety beacon is placed. The safety beacon is then placed on the platform of the base adapter 310 and can operate on top of the safety cone 302. In an alternate embodiment, the safety beacon includes a GPS chip for determining its location and a transceiver for communicating the location of the safety beacon for tracking purposes.

Figure 10:
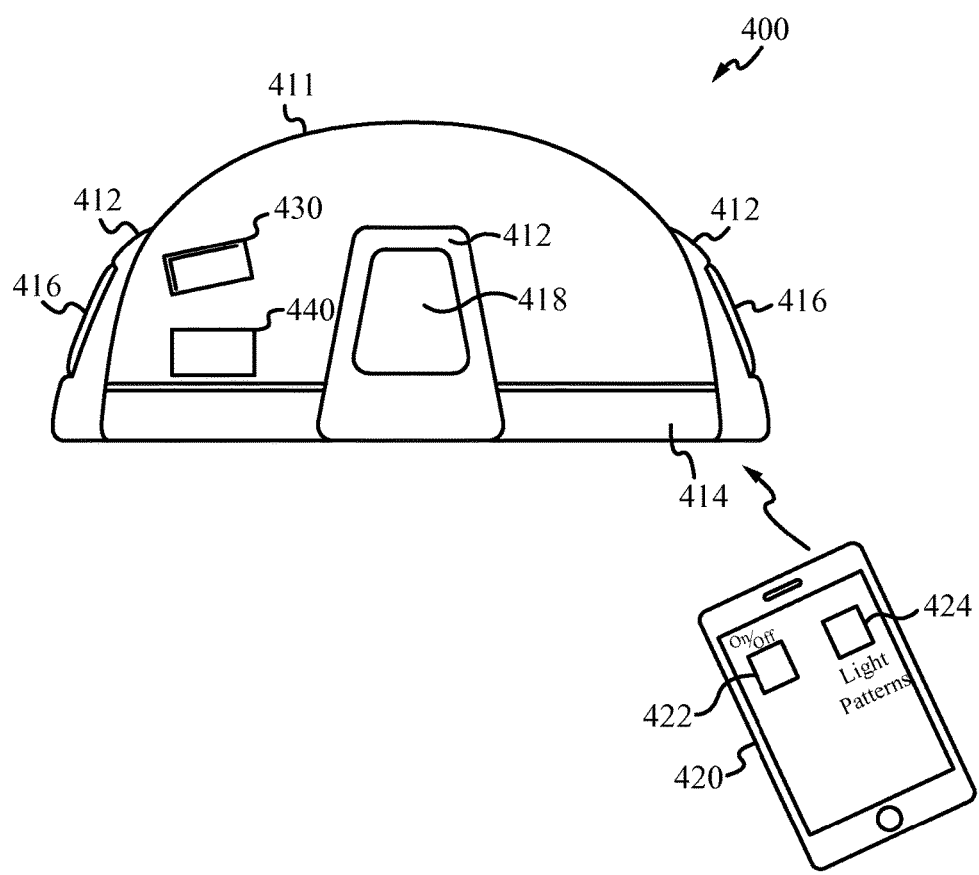
FIG. 10 illustrates a front view of a safety beacon in accordance with some embodiments.

Referring now to FIG. 10, a front view of a safety beacon 400 in accordance with some embodiments is depicted therein. The beacon 400 comprises a base 414, an outer housing 411, one or more protective posts 412, positioned around the housing and a power switch 418 for manually turning the safety beacon 400 on and off. As described above, the beacon 400 also comprises a light source, a power source, and a controller for controlling the operation of the safety beacon 400. In some embodiments, the power source is a battery. In some embodiments, the power source is a solar cell. Alternatively the safety beacon 400 comprises a power port, wherein the power source is recharged by connecting a connector cable to the power port and to a power outlet.

As shown in FIG. 10, the safety beacon 400 further comprises one or more connection ports 416, as described above. The one or more connection ports 416 transmit and receive power up and control signals. In some embodiments, the one or more connection ports 416 include a female adapter. The female adapter receives the end of a cable in order to couple multiple safety beacons 400 together in a wired manner. In further embodiments, the one or more connection ports 416 transmit and receive wireless power up and control signals. When multiple safety beacons 400 are coupled together, the beacons 400 are able to send and receive power up and control signals in a wireless manner. In some embodiments, the control signals include the different modes of operation of the safety beacon, such as on, off, steady illumination and flashing.

In some embodiments, the safety beacon 400 sends a power up and control signal to a second safety beacon (not shown). Alternatively, the safety beacon 400 receives a power up and control signal from the second safety beacon. The safety beacon 400 is able to share power up and control signals by sending and receiving signals through the one or more connection ports 416. In some embodiments, the safety beacon 400 is able to share power up and control signals when coupled to the second safety beacon through a cable.

In some embodiments, as described above, a remote control is used to control the safety beacon 400. However, the safety beacon 400 is also able to be controlled by an application located on a computing device 420. In some embodiments, user is able to turn the safety beacon 400 on and off and control the light pattern by using the buttons 422 and 424 of the computing device 420. In some embodiments, the computing device is selected from a group consisting of a personal computer, a laptop computer, a computer workstation, a server, a mainframe computer, a handheld computer, a personal digital assistant, a cellular/mobile telephone, a smart appliance, a tablet, an iPad® and a gaming console. In some embodiments, the application is running on a telephone or other remote, hand-held computing device.

In further embodiments, as shown in FIG. 10, the safety beacon 400 comprises a motion sensor 440. In these embodiments, the motion sensor 440 is coupled to the controller. The motion sensor 440 sends a signal to the controller, which operates the safety beacon 400 in a manner dependent upon the signal sent from the motion sensor 440. In some embodiments, the motion sensor 440 sends a signal to the controller based upon the presence of motion near the safety beacon 440 and in response the controller turns on the lighting source to illuminate the safety beacon. In some embodiments, after the light source is powered on, a signal is sent through the one or more connection ports 416 to a second safety beacon to power up and turn on. Consequently, a plurality of safety beacons are able to be powered on in succession upon sensing motion at a safety beacon 400.

As also shown in FIG. 10, in some embodiments, the safety beacon 400 comprises a GPS locator 430. In these embodiments, the GPS locator 430 comprises a GPS chip for determining the location of the beacon and a transceiver for communicating its location for tracking purposes. The GPS locator 430 is coupled to the controller and sends a signal to the controller which operates the safety device based upon a signal from the GPS locator 430. In some embodiments, a user is able to observe a location of the safety beacon 400 by using a program located on the computing device 420.

As shown in FIG. 10, the outer housing 411 is a semi-circular shape. However, as will be apparent to someone of ordinary skill in the art, the outer housing 411 is able to comprise any shape depending on the desired use of the safety beacon 400.

FIGS. 11A-11D illustrate a plurality of safety beacons of different shapes in accordance with further embodiments.

Figure 11A:
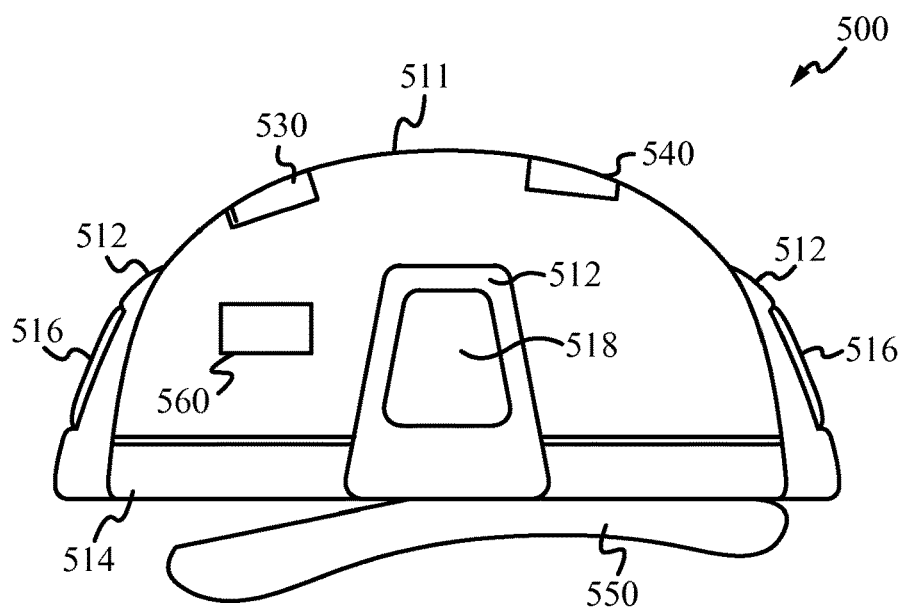
FIG. 11A illustrates a front view of a safety beacon in accordance with some embodiments.

As shown in FIG. 11A, the safety beacon 500 comprises a base 514, an outer housing 511, one or more protective posts 512, positioned around the housing and a power switch 518 for manually turning the safety beacon 500 on and off. The safety beacon 500 also comprises a light source, a power source, and a controller for controlling the operation of the safety beacon 500, as described above. In some embodiments, the power source is a battery. In some embodiments, the power source is a solar cell. Alternatively the safety beacon 500 comprises a power port, wherein the power source is recharged by connecting a connector cable to the power port and to a power outlet. The safety beacon 500 further comprises one or more connection ports 516, a motion sensor 540 and a GPS locator 530.

As further shown in FIG. 11A, the safety beacon 500 comprises a clip 550 for removably attaching the safety beacon 500 to an additional object. For example, in some embodiments, the safety beacon 500 removably attaches to one or more of a clothing item and bag of a user. In some embodiments, the safety beacon 500 is removably attached to one or more of a clothing item and a bag of a child. Accordingly, a parent or guardian of the child is able to activate the light source of the safety beacon 500 in a manner as described above in order to more closely monitor a child. In further embodiments, a parent or guardian is able to utilize the GPS locator 530 in order to monitor the location of the child.

In some embodiments, the safety beacon 500 comprises a sound device 560. The sound device 560 is coupled to the controller and the controller operates the sound device 560 based upon a signal sent from the GPS locator 530. For example, the controller is able to activate the sound device 560 based upon a signal from the GPS locator 530 that the safety beacon 500 has entered or exited a certain area, such as if a child has strayed beyond a yard or a designated play area. In some embodiments, the sound device 560 generates an audible alert to notify the child that they have left the designated area. In some embodiments, the controller activates the sound device 560 and illuminates the safety beacon 500 if the child leaves a designated area.

In further embodiments, the sound device 560 is controlled by an application located on a computing device. In some embodiments, an alert is generated by the application on the computing device if the child leaves a designated area. In further embodiments, an alert is generated by the application on the computing device and the application activates the sound device 560 and illuminates the safety beacon 500 so that a user can easily see, hear and find the safety beacon 500 and the wandering child. In some embodiments, a user uses the computing device to generate an audible alert that is hearable at the location of the safety beacon 500. For example, a user may generate an alert announcing, "dinner's ready, time to come home." As will be apparent to someone of ordinary skill in the art, the safety beacon is able to communicate any message.

As described above, the one or more connection ports 516 transmit and receive wireless power up and control signals. Accordingly, when multiple safety beacons 500 are coupled or grouped together, the beacons 500 are able to send and receive power up and control signals in a wireless manner, such as in a classroom and a field trip setting. For example, in some embodiments, multiple beacons are able to transmit steady illumination or flashing control signals in order to signal that it is time to leave the classroom or field trip area. In some embodiments, an application located on a computing device is used to send the signal that it is time to leave. In some of these embodiments, the application is used to signal a first beacon to power up and illuminate. Then, upon receiving the signal, the connection port of the first beacon sends a signal to a second connection port of a second beacon to power up and illuminate, and so on, until all the beacons have been powered up and illuminated and all of the children have been notified that it is time to leave. Alternatively, the application is used to power up and illuminate all the beacons simultaneously to announce that it is time to leave. In further embodiments, the application is used to generate an audible indication that it is time to leave.

As further described above, the housing 511 of the safety beacon 500 is able to comprise different shapes according to the desired use of the safety beacon 500. For example, in some embodiments, the safety beacon 500 is in the shape of a ladybug. Additionally, as shown in FIG. 11A, the attachment means of the safety beacon is a clip 550. However, as will be apparent to someone of ordinary skill in the art, the attachment means is able to comprise any appropriate attachment means as known in the art. For example, in some embodiments the attachment means is one or more of a magnet or a hook and loop fastening system. Additionally, as will be apparent to someone of ordinary skill in the art, the safety beacon 500 is able to be attached to other objects as desired by a user. For example, in some embodiments, the safety beacon 500 is removably attached to a collar of a pet so that an owner may more closely monitor the pet in an off leash situation.

Figure 11B:
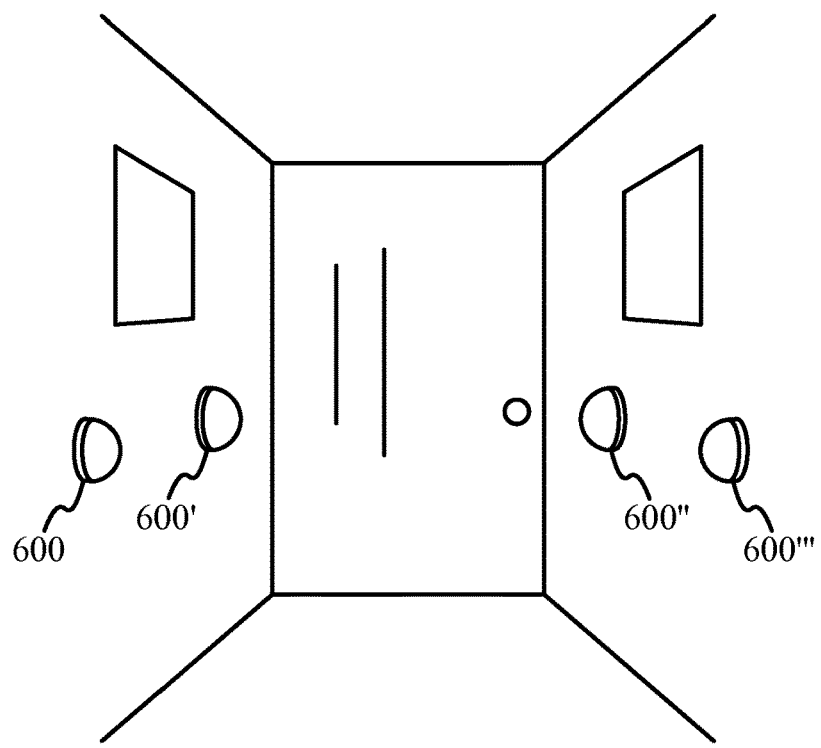
FIG. 11B illustrates a set of safety beacons in accordance with some embodiments.
Figure 11C:
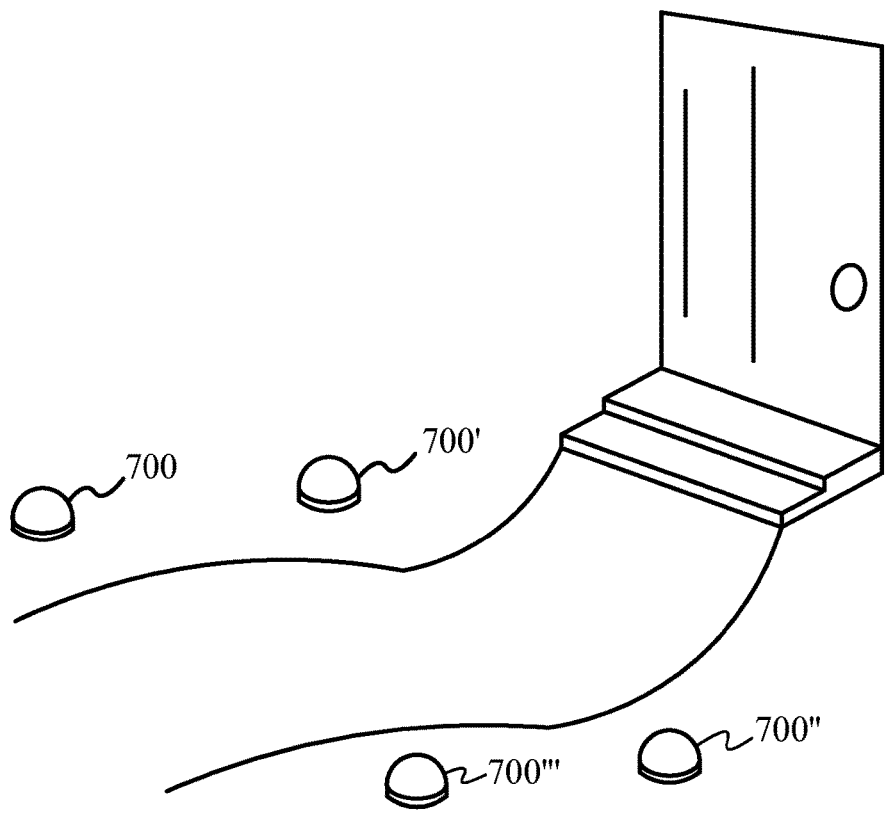
FIG. 11C illustrates a set of safety beacons in accordance with some embodiments.
Figure 11D:
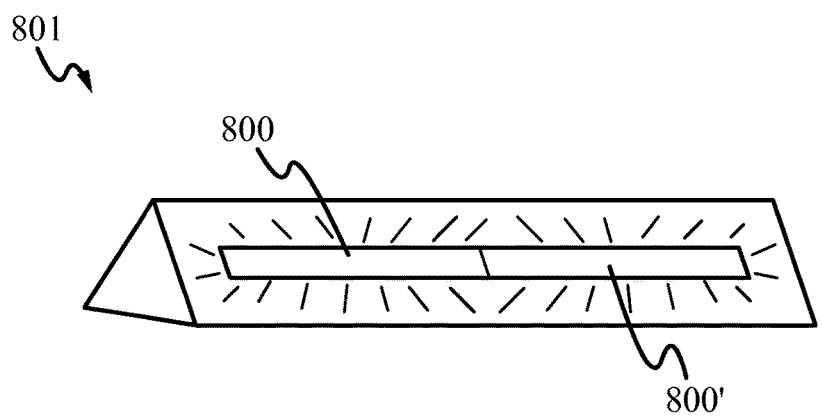
FIG. 11D illustrates a set of safety beacons in accordance with some embodiments.

FIGS. 11B-11D illustrate a set safety beacons in accordance with further embodiments. As shown in FIG. 11B, the safety beacons 600, 600', 600", and 600''' comprise a set of wall mounted hall lights. The safety beacons 600, 600', 600", and 600''' each comprise a base, an outer housing, a light source, a power source, one or more connection ports, and a controller for controlling the operation of the safety beacons 600, 600', 600", and 600''', as described above. In some embodiments, the power source is a battery. In some embodiments, the power source is a solar cell. Alternatively safety beacons 600, 600', 600", and 600''' comprise a power port, wherein the power source is recharged by connecting a connector cable to the power port and to a power outlet. In some embodiments, one or more of the safety beacons 600, 600', 600", and 600''' comprises a motion sensor.

As described above, the one or more connection ports transmit and receive wireless power up and control signals. Accordingly, the safety beacons 600, 600', 600", and 600''' send and receive power up and control signals in a wired and a wireless manner. As further described above, the motion sensor is coupled to the controller and sends a signal to the controller, which operates the one or more of the safety beacons 600, 600', 600", and 600''' in a manner dependent upon the signal sent by the motion sensor. In some embodiments, the motion sensor sends a signal to the controller based upon the presence of motion near one or more of the safety beacons 600, 600', 600", and 600''' and in response the controller turns on the lighting source to illuminate the one or more of the safety beacons 600, 600', 600", and 600". In some embodiments, after the light source is powered on, a signal is sent to an additional safety beacon to power up and turn on that safety beacon.

The safety beacons 600, 600', 600", and 600''' are able to turn on in an sequential manner upon the presence of motion at an end of the hall. For example, if a person enters a dark hall at one end, the closest safety beacon will sense motion and activate the safety beacon and then send a control signal to the next safety beacon, and so on until the entire hall is illuminated. Thus, making it easier to navigate a once dark hallway. As will be apparent to someone of ordinary skill in the art, although the safety beacons 600, 600', 600", and 600''' are shown in a hallway, the safety beacons 600, 600', 600", and 600''' are able to illuminate any room and may be used in any number and configuration.

Alternatively as shown in FIG. 11C, the safety beacons 700, 700', 700", and 700''' comprise a set of landscaping path lights. As described above, the safety beacons 700, 700', 700", and 700''' each comprise a base, an outer housing, a light source, a power source, one or more connection ports, and a controller for controlling the operation of the safety beacons 700, 700', 700", and 700''', as described above. In some embodiments, the power source is a battery. In some embodiments, the power source is a solar cell. Alternatively safety beacons 700, 700', 700", and 700''' comprise a power port, wherein the power source is recharged by connecting a connector cable to the power port and to a power outlet. In some embodiments, one or more of the safety beacons 700, 700', 700", and 700''' comprise a motion sensor.

As described above, the one or more connection ports transmit and receive wireless power up and control signals. Accordingly, the safety beacons 700, 700', 700", and 700''' send and receive power up and control signals in a wired and a wireless manner. As further described above, the motion sensor is coupled to the controller and sends a signal to the controller, which operates the one or more of the safety beacons 700, 700', 700", and 700'" in a manner dependent upon the signal sent by the motion sensor. In some embodiments, the motion sensor sends a signal to the controller based upon the presence of motion near one or more of the safety beacons 700, 700', 700", and 700'" and in response the controller turns on the lighting source to illuminate one or more of the safety beacons 700, 700', 700", and 700". In some embodiments, after the light source is powered on, a signal is sent to an additional safety beacon to power up and turn on the safety beacon.

Accordingly, the safety beacons 700, 700', 700", and 700'" are able to turn on in an sequential manner upon the presence of motion at an end of the path. For example, if a person enters or approaches the pathway at one end, the closest safety beacon will sense motion and activate the safety beacon and then send a control signal to the next safety beacon, and so on until the entire path is illuminated. Thus, making it easier to see the pathway and also allow an approaching person to be seen. As will be apparent to someone of ordinary skill in the art, the safety beacons 700, 700', 700", and 700'" are able to be implemented in any number and configuration. Additionally, as will be apparent to someone of ordinary skill in the art, the safety beacons 700, 700', 700", and 700'" are able to turn on in a non-sequential manner such as when motion is sensed at the middle or other portion of the path.

As will be further apparent to someone of ordinary skill in the art, the safety beacons 700, 700', 700", and 700'" are able to be removable and comprise decorative shapes and patterns. For example, in some embodiments, the safety beacons 700, 700', 700", and 700'" comprise decorative holiday lights.

In further embodiments, as shown in FIG. 11D, the safety beacons 800 and 800' comprise a portion of a traffic control device 801. As described above, traffic control devices are used at major events for traffic control and illuminating pathways to be followed by automobiles or other vehicles and can also be used for funeral processions as a notification to other drivers as to their need to stay grouped together. Roadway workers and cleanup crews can also use traffic control devices for protection to notify passing traffic that they are working near or on the roadside.

In some embodiments, one or more of the safety beacons 800 and 800' comprises a motion sensor. In some embodiments, as a vehicle approaches the traffic control device 801, the closest safety beacon will sense motion and activate the safety beacon and then send a control signal to the next safety beacon, and so on until the entire traffic control device is illuminated. As will be apparent to someone of ordinary skill in the art, the one or more safety beacons 800 and 800' of the traffic control device 801 are able to communicate with one or more additional safety beacons of an additional traffic control device. In alternative embodiments, the one or more safety beacons 800 and 800' are controlled by a power switch, a remote control or an application located on a computing device, as described above.

Figure 12:
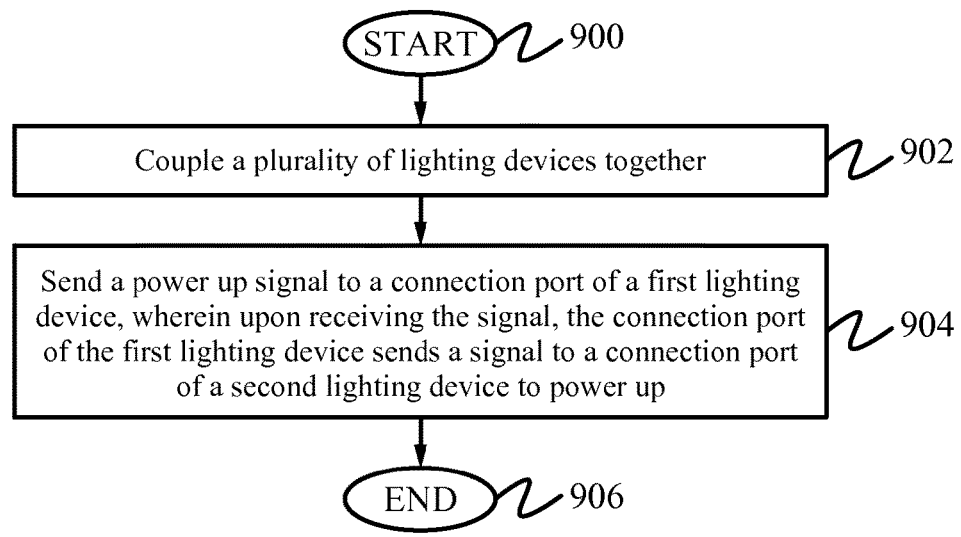
FIG. 12 illustrates a method of providing light to a space in accordance with some embodiments.

FIG. 12 illustrates a method of providing light to a space in accordance with some embodiments. In the step 902, a plurality of safety beacons are coupled together. Then, in the step 904, a power up signal is sent to a connection port of a first safety beacon, wherein upon receiving the power up signal the connection port of the first safety beacon sends a signal to a connection port of a second safety beacon to power up. In this manner a series of safety beacons are able to power on in a sequential manner and non-sequential manner as described above.

Another main use for the safety beacon of the present invention is in the field of child and neighborhood safety. The safety beacon can be used in front of households, at parks and in neighborhoods in which children are playing to alert passing drivers that children are present and may be playing in or near the street. The safety beacon can be placed out in the street while the children are playing and set to pulsate at bright levels that will provide an alert to oncoming drivers. The safety beacon can also be attached to backpacks and jackets in order to provide an alert, illumination and an enhanced warning to drivers while children or adults are walking or riding bicycles. As discussed above, using a base adapter, a safety beacon can also be attached to a safety cone and positioned near children playing in order to provide a warning to drivers. As should be apparent to those skilled in the art, the size of the base adapter can be varied to fit different size safety cones and other support structures.

Figure 13A:
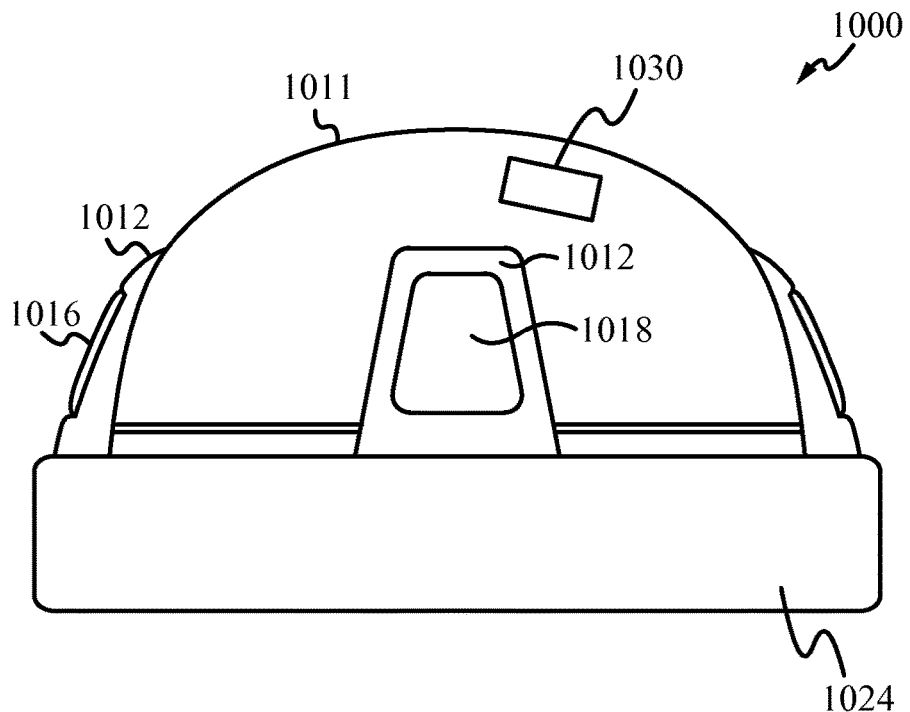
FIG. 13A illustrates a front view of a safety beacon in accordance with some embodiments.

FIG. 13A illustrates a safety beacon 1000 in accordance with further embodiments. The safety beacon 1000 comprises a base 1024, an outer housing 1011, one or more protective posts 1012, positioned around the housing 1011 and a power switch 1018 for manually turning the safety beacon 1000 on and off. The safety beacon 1000 also comprises a light source, a power source, and a controller for controlling the operation of the safety beacon 1000. In some embodiments, the power source is a battery. In some embodiments, the power source is a solar cell. Alternatively, the safety beacon 1000 comprises a power port, wherein the power source is recharged by connecting a connector cable to the power port and to a power outlet. In some embodiments the safety beacon 1000 further comprises one or more connecting ports 1016 and a GPS locator 1030, as described above.

In some embodiments, the base 1024 comprises a floatable material so that when the safety beacon 1000 is placed within a body of water, the safety beacon 1000 floats on top of the water. In some embodiments, the base 1024 comprises one or more of foam and cork. However, the base 1024 is able to comprise any appropriate floatable material as known in the art. In further embodiments, the base 1024 is removable and removably fits over a base of a safety beacon 10, as described above. In some embodiments, the components of the beacon 1000 are substantially waterproof. In some embodiments, the beacon 1000 is ingress protection rated.

When placed within the water, an illuminated safety beacon 1000 may be placed near swimmers, divers, snorkelers, boats and other hazards in order to warn other watercraft and persons of the presence of these hazards. The safety beacon 1000 may be powered on by the power switch 1018, a remote control or an application located on a computing device, as described above and may be controlled to have a steady light or blink.

Figure 13B:
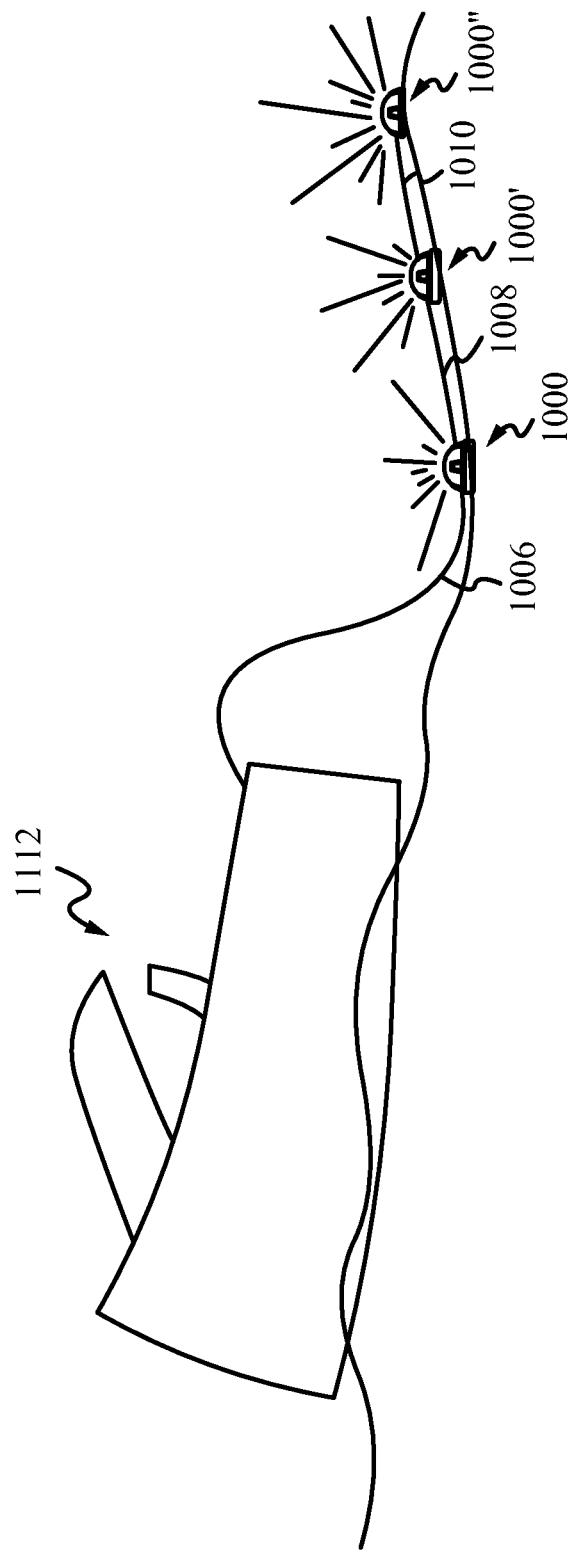
FIG. 13B illustrates a set of safety beacons in accordance with some embodiments.

In further embodiments, the light source of the safety beacon 1000 is viewable from a bottom of the beacon 1000. In these embodiments, the beacon 1000 is viewable from under the water when it is illuminated. Accordingly, swimmers, divers and snorkelers are able to watch the safety beacon 1000 in order to maintain a position within the water without drifting too far from a point. In some embodiments, the safety beacon 1000 is attached to a boat 1112 (FIG. 13B). In these embodiments, a user is able to watch the safety beacon 1000 when under the water in order to stay close to the boat 1112.

As described above, in some embodiments, the safety beacon 1000 comprises a GPS chip 1030 for determining the location of the beacon 1000 and a transceiver for communicating its location for tracking purposes. In some embodiments, a location of the safety beacon 1000 is viewable by using a program located on a computing device, as described above. In some embodiments, a location of the safety beacon 1000 is viewable after illuminating the beacon 1000 and using a program located on a computing device to determine the beacon's 1000 location. In this manner, the beacon 1000 is easily observed, such as in the case of a rescue operation.

A set of safety beacons 1000, 1000', and 1000" coupled together and coupled to a boat 1112 is illustrated in FIG. 13B. In FIG. 13B, a cable 1006 is coupled between the boat 1112 and the safety beacon 1000. In some embodiments, the cable 1006 is a power cable and provides power to the beacons 1000, 1000', and 1000" through the cables 1008 and 1010, respectively. In further embodiments, the cables 1006, 1008, and 1010 connect the safety beacons 1000, 1000', and 1000" to the boat so that the beacons 1000, 1000', and 1000" do not float away. As described above, the beacons 1000, 1000', and 1000" are able to send and receive power up and control signals in a wired and a wireless manner. In some embodiments, the control signals include the different modes of operation of the safety beacon, such as on, off, steady illumination and flashing. When coupled to a boat, the beacons 1000, 1000', and 1000" may be used to indicate mechanical problems, that someone being towed has fallen, or to the presence of swimmers and divers, as describe above. Although shown coupled to a boat 1112, as will be apparent to someone of ordinary skill in the art, the beacons 1000, 1000', and 1000" may be coupled to any appropriate watercraft.

In use, a safety beacon 1000 may be placed in a body of water in order to warn of hazardous conditions that may not be perceived otherwise. The safety beacon 1000 may be placed near swimmers, divers, snorklers in order to aid in navigation while in the water and to alert others of their presence. Further, by utilizing a GPS locator 1030 and illuminating the beacon 1000, the beacon 1000 may separately be found by sight and by using a program located on computing device while in the water.

Figure 14:
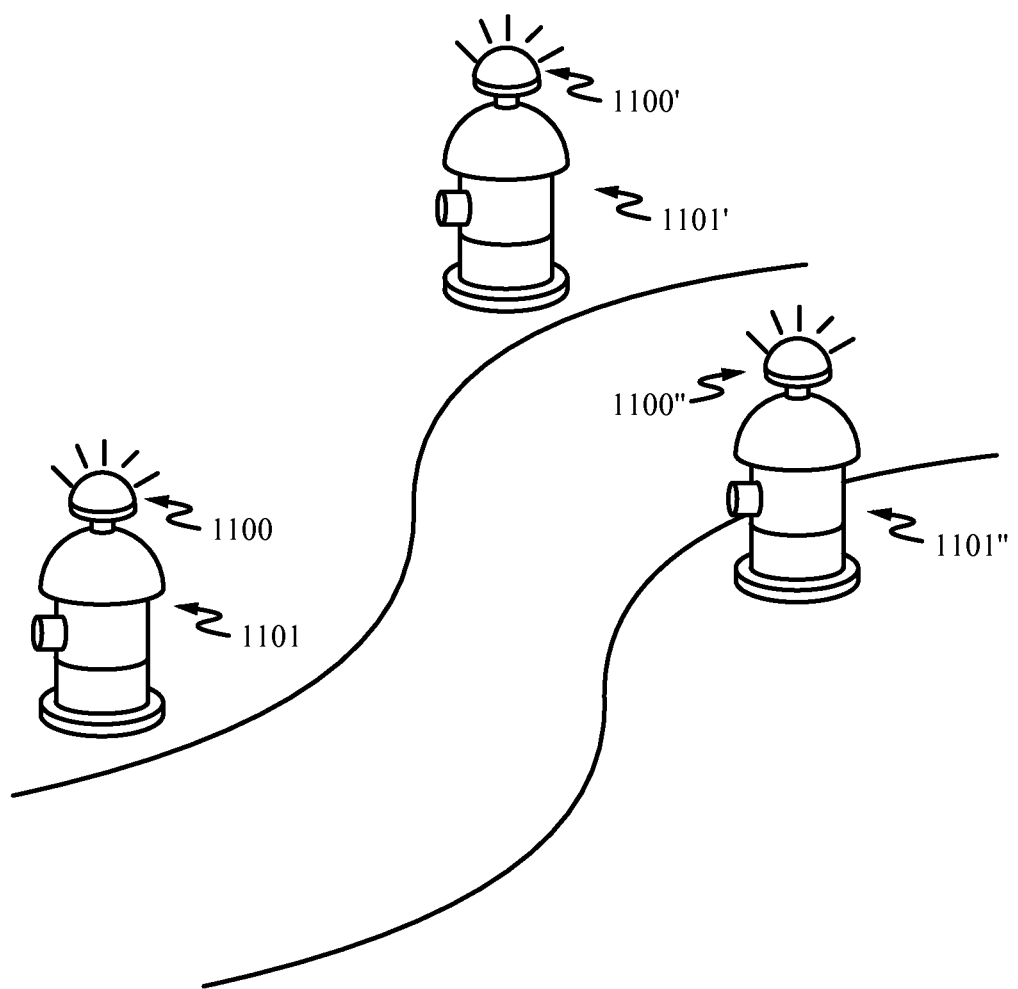
FIG. 14 illustrates one or more safety beacons in accordance with some embodiments.

FIG. 14 illustrates one or more safety beacons 1100, 1100', 1100" in accordance with further embodiments. In some embodiments, a safety beacon 1100 comprises a base, an outer housing, one or more protective posts positioned around the housing, and a power switch for manually turning the safety beacon 1100 on and off. The safety beacon 1100 also comprises a light source, a power source, and a controller for controlling the operation of the safety beacon 1100. In some embodiments, the power source is a battery. In some embodiments, the power source is a solar cell. Alternatively, the safety beacon 1100 comprises a power port, wherein the power source is recharged by connecting a connector cable to the power port and to a power outlet. In some embodiments, the beacon 1100 further comprises one or more connecting ports, a GPS locator, and a sound device, or a combination thereof.

As shown in FIG. 14, the safety beacon 1100 is coupled to an additional object 1101. In some embodiments, the safety beacon 1100 is removably coupled to the additional object 1101. In some embodiments, by illuminating the safety beacon 1100, a user is able to mark and find the additional object. As described above, the safety beacon 1100 may be controlled to have a steady light or blink. In some embodiments, a user is able to activate the sound device and use the GPS locator in order to mark and find the safety beacon 1100. In this manner, the safety beacon 1100 is easily separated and picked out from the surrounding scenery when the beacon 1100 is powered up and activated. In some embodiments, the safety beacon 1100 is powered on and controlled by one or more of the power switch, a remote control, and an application located on a computing device, as describe above.

In further embodiments, the safety beacon 1100 doesn't have a power switch for manually turning the beacon 1100 on and off so that the beacon 1100 is tamper resistant when coupled to an additional object 1101 located in a public place. In some embodiments, the housing of the safety beacon 1100 is substantially tamper resistant and impact resistant. As further shown in FIG. 14, the safety beacon 1100 is coupled to a fire hydrant 1101. However, the safety beacon 1100 may be coupled to any appropriate object that a user wishes to mark and find. For example, in some embodiments, the safety beacon 1100 is coupled to a mailbox or light pole.

In some embodiments, when coupled to a fire hydrant 1101, the safety beacon 1100 is controlled using a computer program located within a fire truck. In some embodiments, the safety beacon 1100 is controlled using a computer program located within a central dispatch office. Alternatively, the safety beacon 1100 is controllable by one or more of a power switch, a remote control, and a program located on a hand held device. When attached to the hydrant 1101, the beacon 1100 may be powered up and illuminated to flash in order to signal the location of the hydrant 1101. When the beacon 1100 is powered up and illuminated it may easily be found during the daytime and during the nighttime, thus saving valuable time when responding to a call.

As described above, in some embodiments, the safety beacon 1100 comprises a GPS locator and a sound device. In these embodiments, the sound device may be activated in order to give an auditory indication of the location of the safety beacon 1100. In some embodiments, a location of the safety beacon 1100 is viewable by using the GPS locator and a program located on a computing device, as described above. In some embodiments, a location of the safety beacon 1100 is viewable after illuminating the beacon 1100, activating the sound device and using a program located on a computing device to determine the beacon's 1100 location. In this manner, the beacon 1100 is further easily observed.

In some embodiments, one or more safety beacons 1100, 1100', and 1100" are able to send and receive power up and controlled signals in a wired and a wireless manner. In some embodiments, the control signals include the different modes of operation of the safety beacon, such as on, off, steady illumination and flashing. In some embodiments, the one or more safety beacons 1100, 1100', and 1100" are separately controllable using one or more of a power switch, a remote control, and an application located on a computing device. In some embodiments, the one or more safety beacons 1100, 1100', and 1100" are controllable simultaneously using one or more of a power switch, a remote control, and an application located on a computing device. When coupled together, the one or more safety beacons 1100, 1100', and 1100" may all illuminate in order to indicate the presence of an event. For example, in some embodiments, the one or more safety beacons 1100, 1100', and 1100" all illuminate in order to indicate the occurrence of an earthquake. Alternatively, in some embodiments, the one or more safety beacons 1100, 1100', and 1100" illuminate in order to indicate the occurrence of a civic event such as a parade.

In use, the one or more safety beacons 1100, 1100', and 1100" may be used to mark and find an object or event. For example, the one or more safety beacons 1100, 1100', and 1100" may be used to help firemen quickly and easily find a closest fire hydrant. Or, the one or more safety beacons 1100, 1100', and 1100" may be used to help paramedics and police officers quickly and easily locate an accident scene. Particularly, the one or more safety beacons 1100, 1100', and 1100" enable a user to save valuable time by locating an object quickly and easily. Additionally, when used in conjunction with one or more additional safety beacons, a large area or route is able to be marked.

The safety beacon of the present invention can also be used to provide alert and tracking for recreational uses, such as bicycling, snow skiing, water skiing and hiking. The safety beacon can also be attached to helmets and equipment for such use in order to provide an alert or illumination. As discussed above, in an alternate embodiment, the safety beacon includes a GPS tracking chip and a transceiver for communicating the location of the safety beacon. The safety beacon of this embodiment, can also be used by recreational users in order to track and identify their location. Further, the safety beacon with the GPS tracking chip can also be traced by law enforcement officers for tracking and locating stolen vehicles.

While the present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

We claim:

1. A safety device comprising:
   a. a light source;
   b. an internal power source coupled to the light source;
   c. a controller coupled to the light source and the power source to control operation of the device; and
   d. a connection port that transmits and receives both power signals that provide power to the device and control signals that are utilized by the controller to control different modes of operation of the device, wherein the controller is programmed to separately power up and operate the safety device both independently and in response to the control signals from one or more other safety devices having other internal power sources;
   wherein when the connection port is coupled with the other safety devices, the controller is programmed to draw power first from the internal power source and then from the other internal power sources when the controller determines that none of the safety device and the other safety devices are receiving power from an external power source.

2. The safety device of claim 1 wherein the connection port transmits and receives a wired signal.

3. The safety device of claim 1 wherein the connection port transmits and receives a wireless signal.

4. The safety device of claim 1 wherein the connection port receives a signal from an external source.

5. The safety device of claim 4 wherein the external source is a remote control.

6. The safety device of claim 4 wherein the external source is a program located on a computing device.

7. The safety device of claim 4 wherein the external source is one or more additional connection port of one or more additional safety devices.

8. The safety device of claim 4 wherein the signal is a signal to power the light source.

9. The safety device of claim 1 further comprising an attachment mechanism for attaching the safety device to an additional object.

10. The safety device of claim 1 wherein the safety device is attached to a traffic control device.

11. The safety device of claim 1 wherein the connection port transmits a control signal to one or more additional safety devices.

12. The safety device of claim 1 further comprising a motion sensor coupled to the controller, wherein the motion sensor sends a signal to the controller and the controller operates the safety device based upon the signal from motion sensor.

13. The safety device of claim 1 further comprising a GPS device for determining its location and a transceiver for communicating the location of the safety device.

14. The safety device of claim 13 wherein the GPS device is coupled to the controller, wherein the GPS device sends a signal to the controller and the controller operates the safety device based upon the signal from the GPS device.

15. The safety device of claim 14 further comprising a sound making device coupled to the controller, wherein the controller operates the sound making device based upon the signal from the GPS device.

16. The safety device of claim 1 wherein the safety device floats when placed in water.

17. The safety device of claim 1, wherein the safety device is used to mark and locate an object or event.

18. A set of safety devices, comprising:
   a. a plurality of safety devices, each comprising:
      i. a light source;
      ii. an internal power source coupled to the light source;
      iii. a controller coupled to the light source and the power source to control operation of the device; and
      iv. a connection port that transmits and receives both power signals that provide power to the device in order to share power with the other safety devices in the set and control signals that are utilized by the controller to control different modes of operation of the device in order to communicate with the other safety devices in the set, wherein the controller is programmed to separately power up and operate the safety device both independently and in response to the control signals from the other safety devices in the set;
   wherein when the connection port of one of the safety devices of the set is coupled with one or more of the other safety devices in the set, the controller is programmed to draw power first from the internal power source of the one of the safety devices and then from the internal power sources of the one or more of the other safety devices when the controller determines that none of the one of the safety devices and the one or more of the other safety devices are receiving power from an external power source.

19. The set of safety devices of claim 18 wherein a connection port of a first safety device of the set of safety devices receives a signal from an external source.

20. The set of safety devices of claim 19 wherein the external source is a remote control.

21. The set of safety devices of claim 19 wherein the external source is a program located on a computing device.

22. The set of safety devices of claim 19 wherein the external source is one or more additional connection ports of one or more additional safety devices of the set of safety devices.

23. The set of safety devices of claim 19 wherein the connection port of the first safety device in the set of safety devices sends a signal based upon the signal from the external source to a connection port of a second safety device in the set of safety devices.

24. The set of safety devices of claim 19 wherein the signal is a signal to power the light source.

25. The set of safety devices of claim 18 wherein one or more additional safety devices of the set of safety devices further comprises a motion sensor coupled to the controller, wherein the motion sensor sends a signal to the controller and the controller operates the safety device based upon the signal from motion sensor.

26. The set of safety devices of claim 18 wherein one or more additional safety device of the set of safety devices further comprises a GPS device for determining its location and a transceiver for communicating the location of the safety device.

27. The set of safety devices of claim 18 wherein the set of safety devices is located inside one or more of a room and a hallway.

28. The set of safety devices of claim 18 wherein the set of safety devices is located outside.

29. The set of safety devices of claim 18 wherein the set of safety devices float when placed in water.

30. The set of safety devices of claim 18 wherein the set of safety devices are used to mark and locate an object or event.

31. A method of providing light to an area, comprising:
   a. coupling a plurality of lighting devices together via one or more connection ports on the devices, each of the devices having an internal power source;
   b. receiving a power signal and a control signal at a connection port of a first lighting device of the plurality of lighting devices; and
   c. upon receiving the power signal and the control signal transmitting the power signal and the control signal from the connection port of the first lighting device to a connection port of a second lighting device, wherein each of the lighting devices are programmed to separately power up and operate both independently and in response to the control signals from the other lighting devices, wherein when the connection port of one of the plurality of lighting devices is coupled with one or more other lighting devices of the plurality of lighting devices, the controller of the one of the lighting devices is programmed to draw power first from the internal power source of the one of the lighting devices and then from the internal power sources of the one or more other lighting devices when the controller of the one of the lighting devices determines that none of the one of the lighting devices and the one or more other lighting devices are receiving power from an external power source.

32. The method of claim 31 wherein the control signal is sent from a remote control.

33. The method of claim 31 wherein the control signal is sent from a program located on a computing device.

34. The method of claim 31 wherein the control signal is sent from a motion sensor of the first lighting device.

35. The method of claim 31 wherein the control signal is sent from a connection port of a third lighting device.

36. The method of claim 31 wherein the area is one or more of a room and a hallway.

37. The method of claim 31 wherein the area is an outdoor area.

38. The method of claim 31 wherein the area is a portion of a body of water.

\* \* \* \* \*